Feb. 26, 1957  A. F. FINK  2,783,320
PRESSURE SWITCH
Filed Sept. 19, 1956
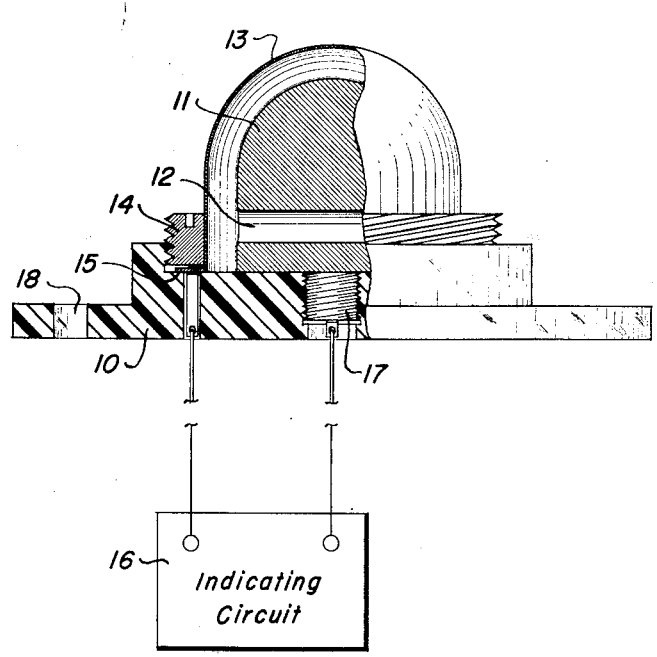
INVENTOR:
Armand F. Fink
BY
Attorney

2,783,320
PRESSURE SWITCH

Armand F. Fink, Albuquerque, N. Mex., assignor, by mesne assignments, to the United States of America as represented by the United States Atomic Energy Commission Application September 19, 1956, Serial No. 610,873

4 Claims. (Cl. 200—61.08)

My invention relates generally to measuring and testing and more particularly to the measurement and indication of the occurrence of an overpressure.

Particularly in the field of destructive testing it is important and difficult to obtain such a measurement. Destructive forces often damage the object under test to the extent that it is impossible to determine where the first failure occurred and the chronological succession of failures which led to destruction.

It is a general object of my invention to provide for the measurement and positive indication of an overpressure.

Numerous efforts have been made in the prior art to provide a satisfactory means for measuring overpressures at various points in the test object and telemetering the results to a recording device. Among these is the use of pencil leads, the type ordinarily used in mechanical pencils, mounted on the test object where overpressures were expected and connected in an electrical circuit. It was expected that an overpressure due to the movement of a member of the test object would break the leads, opening the circuit and furnishing an indication. However, in practice it is found that stresses transmitted to the leads via the mounting plate frequently crack the leads without opening the circuit. A later pressure considerably less than that expected could then prematurely open the circuit, giving a false indication.

Another object of my invention is to provide a pressure switch which closes positively only upon direct application of a pressure.

A glass plate bearing a conductive circuit also has been used to indicate the occurrence of an overpressure. Here again stresses are set up within the device due to changes in the temperature or mechanics of the device under test. These stresses frequently are enough to break the glass, opening the conductive circuit before the occurrence of direct pressure on the glass.

Still another object of my invention is therefore the provision of a pressure switch relatively insensitive to stresses caused by changes in temperature and mechanics of the device under test.

Both of the beforementioned pressure switches of the prior art are more sensitive to pressures acting in a particular direction than to those acting in other directions. While the pencil leads are most easily broken by pressures acting in a plane perpendicular to their lengths, the glass plate has a more limited response in that its sensitivity is greatest in a single direction, namely perpendicular to the plane of the plate.

A further object of my invention is to provide a pressure switch equally sensitive to pressures acting from any direction upon a substantially planar surface.

Still another object of my invention is to provide a simple, economical pressure switch which is easily installed to produce a sharp, fast indication of the occurrence of an overpressure.

Briefly, my invention in its preferred form includes two conducting domes, mounted concentrically and spaced from one another. A pressure sufficient to crush or deform the outer dome causes it to make contact with the inner dome, thus closing an electrical circuit which may be connected between the two domes.

A better understanding of my invention may be had, and other objects will become apparent, upon reading the detailed description to follow in conjunction with the attached drawing which is a single figure illustrating a preferred embodiment of my invention.

As shown in the figure, which is a partial longitudinal section, the pressure switch is mounted on a non-conducting base 10. Conducting inner dome 11, which is preferably of solid metal, is screwed into the base by threaded portion 17. Its installation is facilitated by hole 12, through which a lever may be inserted for tightening purposes. Outer dome 13 is made of thin metal and is spaced equally on all sides from inner dome 11 by retainer ring 14, which screws into base 10, holding the outer dome against contact ring 15.

An electrical indicating circuit 16 has its input terminals connected, one to the inner dome and one to contact ring 15 and hence to the outer dome, by the electrical conductors shown. When a force or pressure sufficient to crush outer dome 13 is applied thereto, a portion of it will be forced inward into contact with inner dome 11, thus completing an electrical circuit between the input terminals of the indicating circuit. A suggested indicating circuit includes a thyratron whose bias is removed by the action of the pressure switch, the resultant pulse by the fired thyratron being used to trigger other circuitry in a telemetering system.

In some telemetering systems it is necessary that the initial trigger, furnished by the pressure switch, be sharp, i. e., the switch should close only once and should stay closed. I have found, through considerable experimentation, that certain materials and surface conditions will lead to the production of a sharp trigger. Outer shell 13 is formed in a conventional draw-die operation from a thin sheet of dead-soft annealed copper, then annealed again to the original dead-soft condition. This is the softest condition obtainable, insuring that once the outer dome is forced against the inner dome it will not bounce away but will remain in contact therewith. Inner dome 11 is fabricated on a lathe, and for convenience can be made of brass or some other easily worked material. After fabricating the inner and outer domes, I roughen their facing surfaces (the inner surface of the outer dome and the outer surface of the inner dome) by sandblasting, then I plate those surfaces with gold to a thickness of about 0.2 mil. The purpose of the surface treatments of sandblasting and gold plating is to provide facing surfaces which will stick to each other and not slide when they touch. The gold has the additional effects of inhibiting corrosion and of providing an excellent electrical contact when the surfaces approach one another to the point where an arc is formed.

It is conceivable that other methods of roughening would provide a suitable surface and that the surfaces could be plated with other metals, but I have chosen sandblasting and gold plating as most conducive to the production of a sharp pulse. Silver was rejected as a plating material because of its susceptibility to tarnish and corrosion, both of which are detrimental to the making of good electrical contact. Gold can be considered non-corrodible under normal conditions of use.

The degree of pressure necessary to collapse the outer dome to a point of contact with the inner dome is, of course, dependent upon the thickness of the outer dome material, the diameter of the outer dome, and the spacing between the two domes. For one application of the pressure switch I found that an outer dome one inch in diameter made of dead-soft copper six mils thick, and spaced one-eighth of an inch from the inner dome was collapsed by an air pressure of seventy-four pounds per square inch applied to the outer dome. The particular spacing was chosen as being sufficient to prevent premature arcing of the voltage, and to prevent premature switch closure due to small dents in the outer dome which might be inflicted during handling and installation.

In order to prevent damage to the outer dome during installation, I suggest that a threaded protective cup of sturdy material be screwed on the portion of retainer ring 14 extending beyond base 10, to be removed prior to any tests for which the instrument is installed. Holes 18 in base 10 are provided for the insertion of screws or bolts to hold the instrument to the object under test. Base 10 may be of many different configurations, depending upon the shape of the surface to which it will be attached.

Using the base shown in the figure, the pressure switch can be mounted on a planar surface with outer dome 13 near to or touching a member of the test object which is expected to move towards the dome during test. Due to the characteristic shape of the dome, the location of the member is immaterial. Sufficient pressure by the member against the dome from any direction whatsoever will cause its collapse.

My invention may also be used to measure fluid overpressures if care is taken to insure a fluid-tight seal between domes 11 and 13, and means are provided to conduct a fluid to the space between the domes. Then, collapse of outer dome 13 will indicate the occurrence of a positive overpressure of the fluid outside it as compared with the fluid pressure inside. Regardless of the type of overpressures measured, simple replacement of the outer dome allows repeated use of the remainder of the switch.

What I have shown and described is a preferred embodiment of my invention. Those skilled in the art will recognize that certain changes may be made in that embodiment without departing from the sphere and scope of my invention as claimed below.

I claim as my invention:

1. A pressure switch comprising a non-deformable conducting inner dome, a deformable conducting outer dome spaced concentrically from said inner dome, and means for attaching electrical connectors to said domes to facilitate determination of electrical contact between said domes due to deformation of said outer dome.

2. A pressure switch as in claim 1 in which said outer dome is made of dead-soft annealed copper.

3. A pressure switch as in claim 2 in which the facing surfaces of said domes are roughened and coated with a soft non-corrodible conductive substance.

4. A pressure switch as in claim 3 in which the soft non-corrodible substance is gold.

No references cited.